US009819419B2

(12) United States Patent
Cai et al.

(10) Patent No.: US 9,819,419 B2
(45) Date of Patent: Nov. 14, 2017

(54) MAXIMUM LIKELIHOOD SEQUENCE ESTIMATION OF QUADRATURE AMPLITUDE MODULATED SIGNALS

(71) Applicant: ZTE Corporation, Shenzhen (CN)

(72) Inventors: Yi Cai, Jackson, NJ (US); Zhensheng Jia, Morganville, NJ (US); Jianjun Yu, Basking Ridge, NJ (US)

(73) Assignee: ZTE Corporation, Shenzhen (CN)

( * ) Notice: Subject to any disclaimer, the term of this patent is extended or adjusted under 35 U.S.C. 154(b) by 106 days.

(21) Appl. No.: 14/877,544

(22) Filed: Oct. 7, 2015

(65) Prior Publication Data

US 2016/0105245 A1     Apr. 14, 2016

Related U.S. Application Data

(60) Provisional application No. 62/060,820, filed on Oct. 7, 2014.

(51) Int. Cl.
*H04B 10/00* (2013.01)
*H04B 10/61* (2013.01)
*H04L 1/00* (2006.01)
*H04L 25/03* (2006.01)

(52) U.S. Cl.
CPC ......... *H04B 10/612* (2013.01); *H04B 10/613* (2013.01); *H04B 10/6161* (2013.01); *H04L 1/0054* (2013.01); *H04L 25/03203* (2013.01); *H04L 2025/0342* (2013.01)

(58) Field of Classification Search
CPC   H04B 10/612; H04B 10/613; H04B 10/6161; H04L 1/0054; H04L 25/03203; H04L 2025/0342

USPC ....................................................... 398/208
See application file for complete search history.

(56) References Cited

U.S. PATENT DOCUMENTS

| | | |
|---|---|---|
| 5,271,042 A | 12/1993 | Borth et al. |
| 5,809,090 A | 9/1998 | Buternowsky et al. |
| 5,812,334 A | 9/1998 | Behrens et al. |
| 6,226,323 B1 | 5/2001 | Tan et al. |
| 6,490,243 B1 | 12/2002 | Tanaka et al. |
| 6,842,495 B1 | 1/2005 | Jaffe et al. |
| 7,027,537 B1 | 4/2006 | Cheong et al. |

(Continued)

FOREIGN PATENT DOCUMENTS

| | | |
|---|---|---|
| CN | 1050958 A | 4/1991 |
| CN | 1393066 A | 1/2003 |

(Continued)

OTHER PUBLICATIONS

Chinese Office Action dated Nov. 15, 2016 for Chinese Application No. 201410104337.7, filed Mar. 20, 2014 (6 pages).

(Continued)

*Primary Examiner* — Juan A Torres
(74) *Attorney, Agent, or Firm* — Perkins Coie LLP

(57) ABSTRACT

In a receiver of Quadrature Amplitude Modulation (QAM) signal, the received QAM signal is divided into multiple Quadrature Phase Shift Keying (QPSK) symbol streams. A Maximum Likelihood Symbol Estimation (MLSE) is performed on each QPSK symbol stream to recover information bits in the received QAM signal. In one advantageous aspect, complexity of implementation can be reduced by performing MLSE on QPSK signals instead of QAM signals.

20 Claims, 11 Drawing Sheets

(56) References Cited

U.S. PATENT DOCUMENTS

| | | | |
|---|---|---|---|
| 7,266,310 | B1 | 9/2007 | Savory et al. |
| 8,041,233 | B2 | 10/2011 | Hueda et al. |
| 8,156,397 | B2 | 4/2012 | Heiman et al. |
| 8,379,709 | B2 | 2/2013 | Hui et al. |
| 8,488,726 | B2 | 7/2013 | Hueda et al. |
| 8,571,416 | B2 * | 10/2013 | Grobe ............... H04B 10/5161 398/135 |
| 8,649,453 | B2 | 2/2014 | Hui et al. |
| 9,329,929 | B2 | 5/2016 | Jia et al. |
| 2001/0001616 | A1 | 5/2001 | Rakib et al. |
| 2002/0196844 | A1 | 12/2002 | Rafie et al. |
| 2003/0058952 | A1 | 3/2003 | Webster et al. |
| 2005/0177860 | A1 | 8/2005 | Goyal et al. |
| 2005/0280568 | A1 | 12/2005 | Rowland et al. |
| 2006/0056547 | A1 | 3/2006 | Buchali et al. |
| 2006/0274861 | A1 | 12/2006 | Langenbach et al. |
| 2008/0199191 | A1 | 8/2008 | Essiambre et al. |
| 2009/0092208 | A1 | 4/2009 | Montekyo et al. |
| 2009/0110124 | A1 | 4/2009 | Fatemi-Ghomi et al. |
| 2009/0177945 | A1 | 7/2009 | Djordjevic et al. |
| 2009/0225899 | A1 | 9/2009 | Dent |
| 2009/0285278 | A1 | 11/2009 | Mamaril et al. |
| 2010/0202504 | A1 | 8/2010 | Murali et al. |
| 2012/0068748 | A1 | 3/2012 | Stojanovic et al. |
| 2012/0224846 | A1 * | 9/2012 | Swanson ............ H04B 10/0705 398/13 |
| 2013/0138375 | A1 | 5/2013 | Zhou et al. |
| 2014/0219666 | A1 | 8/2014 | Tselniker et al. |
| 2014/0233966 | A1 * | 8/2014 | Yu ...................... H04B 10/616 398/208 |
| 2014/0289589 | A1 * | 9/2014 | Jia ........................ G06F 11/10 714/776 |
| 2014/0325319 | A1 | 10/2014 | Cai et al. |
| 2016/0020857 | A1 | 1/2016 | Jia et al. |

FOREIGN PATENT DOCUMENTS

| | | |
|---|---|---|
| EP | 1 213 852 A1 | 6/2002 |
| WO | 2007/021952 A2 | 2/2007 |

OTHER PUBLICATIONS

Chinese Office Action dated Nov. 28, 2016 for Chinese Application No. 201410103677.8, filed Mar. 20, 2014 (12 pages).

Fahmy, S.A., "Histogram-Based Probability Density Function Estimation on FPGAs," 2010 International Conference on Field-Programmable Technology, pp. 449-453, (2010).

Cai, Y., et al., "On turbo Code Decoder Performance in Optical-Fiber Communication Systems With Dominating ASE noise," Journal of Lightwave Technology, 21(3):727-734, Mar. 2003.

Djordjevic, I.B., et al., "Achievable Information Rates for High-Speed Long-Haul Optical Transmission," Journal of Lightwave Technology, 23(11)3755-3763, Nov. 2005.

Djordjevic, I.B., et al., "Suppression of Fiber Nonlinearities and PMD in Coded-Modulation Schemes With Coherent Detection by Using Turbo Equalization," Journal of Optical Communications and Networking, 1(6):555-564, Nov. 2009.

European Search Report dated Aug. 26, 2014 for European Application No. 14160741.6, filed Mar. 19, 2014 (5 pages).

European Search Report dated Dec. 14, 2015 for European Application No. 15275173.1, filed Jul. 13, 2015 (8 pages).

European Search Report dated Feb. 19, 2016 for European Application No. 15275211.9, filed Oct. 7, 2015 (12 pages).

Fatadin, I., et al., "Carrier Phase Recovery for 16-QAM Using QPSK Partitioning and Sliding Window Averaging," IEEE Photonics Technology Letters, 26(9):854-857, May 2014.

Forney, G.D., Jr., "Maximum-Likelihood Sequence Estimation of Digital Sequences in the Presence of Intersymbol Interference," IEEE Transactions on Information Theory, IT-18(3):363-378, May 1972.

Gao, Y., et al., "Low-Complexity Two-Stage Carrier Phase Estimation for 16-QAM Systems using QPSK Partitioning and Maximum Likelihood Detection," Optical Fiber Communication Conference/National Fiber Optic Engineers Conference 2011, OSA Technical Digest (CD) (Optical Society of America, 2011), paper OMJ6, 3 pages, Mar. 2011.

Hui, D., et al., "Maximum Likelihood Sequence Estimation in the Presence of Constant Envelope Interference," IEEE 58th Vehicular Technology Conference, 2003 (VTC 2003—Fall), vol. 2, pp. 1060-1064, Oct. 2003.

Jia, Z., et al., "Experimental demonstration of iterative post-equalization algorithm for 37.5-Gbaud PM-16QAM quad-carrier Terabit superchannel," Optics Express, 23(3):2157-2162, Feb. 2015.

Lobanov, S., et al., "Influence of non-Gaussian statistics in Duobinary Transmission," 2006 Conference on Lasers and Electro-Optics and 2006 Quantum Electronics and Laser Science Conference, Long Beach, California, paper CThY6, pp. 1-2, May 2006.

* cited by examiner

MAXIMUM LIKELIHOOD SEQUENCE ESTIMATION OF QUADRATURE AMPLITUDE MODULATED SIGNALS

CROSS REFERENCE TO RELATED APPLICATIONS

This patent document claims the benefit of U.S. Provisional Patent Application No. 62/060,820, filed Oct. 7, 2014. The entire content of the before-mentioned patent application is incorporated by reference as part of the disclosure of this document.

BACKGROUND

This patent document relates to digital communication and receiving Quadrature Amplitude Modulated (QAM) signals.

There is an ever-growing demand for data communication in application areas such as wireless communication, fiber optic communication and so on. The demand on core networks, typically optical networks, is especially higher because not only are user devices such as smartphones and computers using more and more bandwidth due to multimedia applications, but also the total number of devices for which data is carried over core networks is increasing.

SUMMARY

In some disclosed embodiments, data from a received QAM signal is recovered using a Maximum Likelihood Sequence Estimator (MLSE) technique. The received QAM signal is separated into multiple Quadrature Phase Shift Keying (QPSK) symbol streams, with each QPSK stream carrying a mutually non-overlapping subset of the received QAM symbols. The QPSK streams are filtered through partial response filters and the outputs are processed using an MLSE detector having multiple states to recover data bits from the QAM signal.

In one example aspect, a method for recovering data from a received Quadrature Amplitude Modulation (QAM) signal is disclosed. The method includes performing a first stage of receiver-side processing to produce a stream of digitized QAM symbols from the received QAM signal, generating, from the stream of digitized QAM symbols, multiple digitized Quadrature Phase Shift Keying (QPSK) symbol streams, processing each of the multiple digitized QPSK symbol streams through a partial response filter, thereby resulting in multiple partially filtered symbols streams, and recovering data bits by performing maximum likelihood sequence estimation (MLSE) algorithm over the partially filtered symbols streams.

In another example aspect, an optical signal receiver apparatus is disclosed. The apparatus includes a memory for storing data and instructions. The apparatus includes electronic circuitry that performs a first stage of processing to recover a stream of digitized QAM symbols from the received QAM signal, a digital signal processor that generates, from the stream of digitized QAM symbols, multiple digitized Quadrature Phase Shift Keying (QPSK) symbol streams, electronic circuitry that processes each of the multiple digitized QPSK symbol streams through a partial response filter, thereby resulting in multiple partially filtered symbols streams, and electronic circuitry that recovers data bits by performing maximum likelihood sequence estimation (MLSE) algorithm over the partially filtered symbols streams.

In yet another example aspect, a computer program product that includes a computer-readable medium on which computer-readable instructions are stored. The instructions, when executed by a computer, causing the computer to implement a data reception method. The method includes separating a stream of 8-Quadrature Amplitude Modulation (8-QAM) symbols into a first stream of Quadrature Phase Shift Keying (QPSK) symbols and a second stream of QPSK symbols. For each QPSK symbol stream, the method includes applying a partial response filter to generate a filtered symbol stream, and performing maximum likelihood sequence estimation (MLSE) on the filtered symbol stream to generate bit decisions. The method then includes merging the bit decisions of the first and the second QPSK symbols streams, and recovering data bits by performing forward error correction on the merged bit decisions.

DETAILED DESCRIPTION

Figure 1:
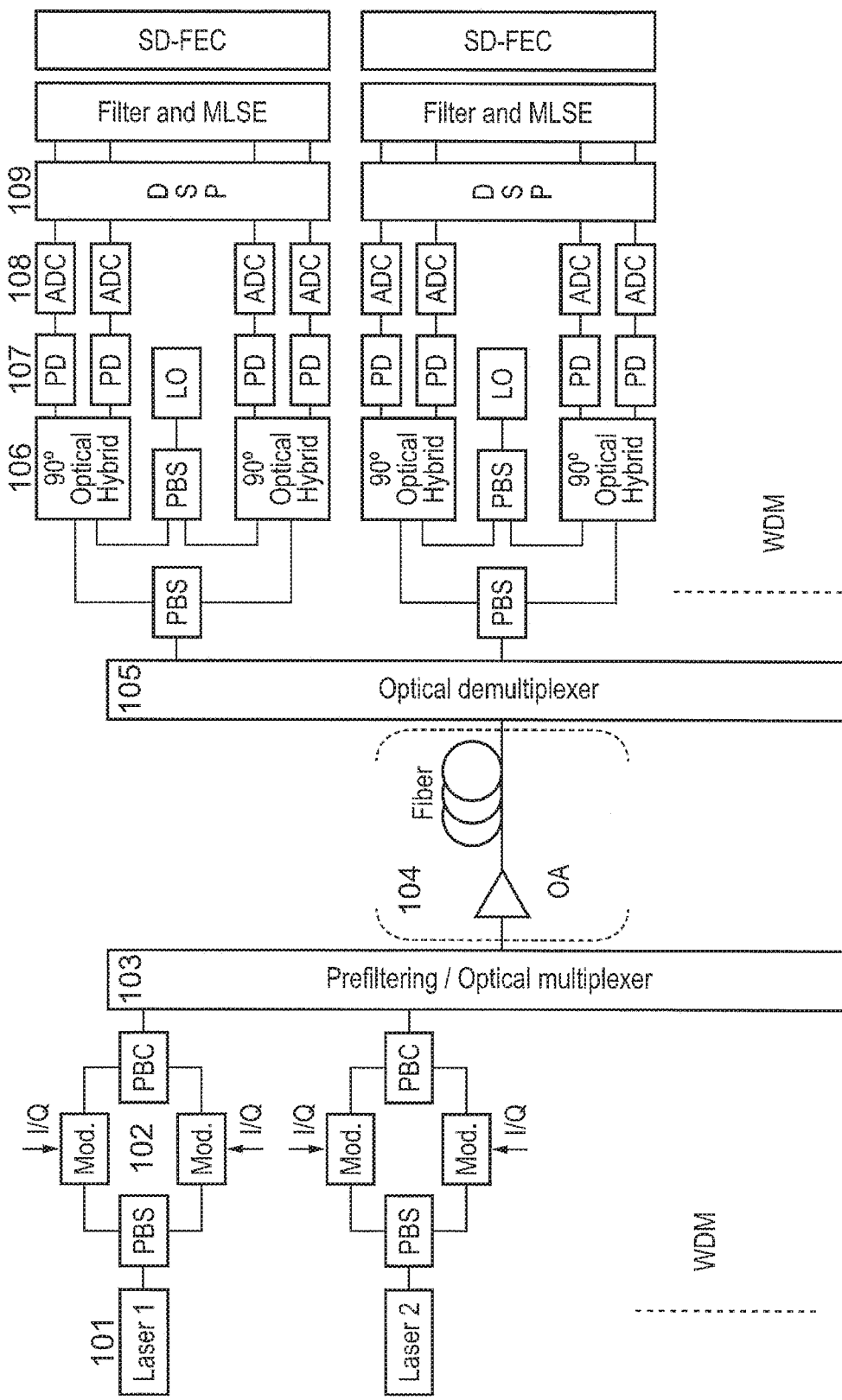
FIG. 1 shows an example of a prefiltering/Nyquist Wavelength Division Multiplexing (WDM) transmission system with coherent detection.

In data transmission systems, information, or data, is often modulated using a modulation technique such as QPSK and QAM modulation. When the modulated signal is transmitted by a source device and while the signal is traveling through a channel such as air or cable or a fiber optic channel, including any intermediate equipment such as a repeater, the modulated signal tends to undergo spectral changes. These spectral changes typically tend to reduce the bandwidth of the useful transmissions, i.e., act as a lowpass filter.

Often, to make the transmitted signal robust against any distortion through the transmission medium, the source may spectrally shape the signal to be a narrowband signal, that is, may intentionally lowpass filter the signal to have a high frequency cutoff that is less than or equal to the expected channel frequency response bandwidth. Occasionally, the transmitted signal may appear to have a narrower spectrum due to transmission distortions.

Narrowing of bandwidth of the signal in the frequency domain tends to spread out signal pulses, e.g., transmitted QPSK or QAM symbols, in the time domain. In other words, due to the narrowband nature of the signal, temporally neighboring symbols may interfere with each other. This degradation in received signal quality is often called inter-symbol interference (ISI). One technique that can be used in the receivers is to use an adaptive filter to compensate the ISI. Since source and channel distortions tend to reduce the effective bandwidth of the signal or make it more lowpass, an adaptive filter tends to compensate or reverse this effect by enhancing the higher frequency content in the signal. Unfortunately, during this process, noise in higher frequencies may also get enhanced. This noise may interfere with symbol decoding process and may tend to increase the bit error rate of the receiver.

On a receive-side, when receiving QPSK signals, a signal processing technique, called maximum likelihood sequence detection (MLSE) technique is often used. The MLSE technique can be useful to, among other uses, reduce the amount of inter-symbol interference caused by a partial response filter used during the data reception processing. To achieve acceptable receiver performance, the combination of a partial response filter and MLSE may be designed to filter out of high frequency noise that is introduced by adaptive digital filter. Adaptive digital filter typically tries to reshape the signal to minimize an error function using an optimization algorithm, e.g., least mean square (LMS) criterion.

In some communication systems, to meet high bandwidth (throughput) demand, higher order constellations, e.g., 8-QAM, 64-QAM, etc., may be used to modulate the signal. When higher order modulations are used, the corresponding signals have corresponding increased number of constellation points, making the task of adaptive filtering, partial filtering, and using MLSE for symbol decisions increases in complexity and also may become more susceptible to noise. The present document discloses techniques, inter alia, for receiving and detecting optical signal employing a QAM modulation format, e.g., 8-QAM, in a coherent optical receiver using maximum likelihood sequence estimation (MLSE). In some embodiments, the performance of narrow filtered QAM signal by balancing inter-symbol interference (ISI) compensation and high frequency noise suppressing with a least mean square (LMS) algorithm based adaptive filter, a partial response high frequency noise suppressing filter, and a MLSE detector. The disclosed scheme provides a partition scheme to implement a 2-state MLSE detector for 8-QAM signal. In one advantageous aspect, the described technique increases the margin of required optical signal to noise ratio (ROSNR) for narrow filtered 8-QAM systems.

In Wavelength Division Multiplexing (WDM) optical transmission systems, transmitted signal may undergo narrow bandwidth signal filtering for many different reasons. For example, narrow prefiltering of signal has been demonstrated to be an effective way to enhance spectral efficiency by reaching super-Nyquist bandwidth, where the channel spacing is set to be smaller than the baud rate (Nyquist bandwidth). In some systems, the optical transport networking functions of reconfigurable optical add-drop multiplexing (ROADM) can narrow the optical signal bandwidth due to spectral truncation after passing multiple wavelength-selective switch (WSS) based optical nodes.

A signal that has undergone narrowband filtering, however, may suffer severe distortion by spreading in the time domain and may be impaired by Inter Symbol Interference (ISI) due to the time-domain spreading of adjacent symbols, thereby possibly reducing the performance of a symbol detection system. The development of coherent detection and digital signal processing (DSP) algorithms has provided effective schemes for mitigating ISI and achieving superior channel equalization. In particular, a scheme that uses a Least-Mean-Squares (LMS) adaptive filter, a partial response noise suppressing filter, and an MLSE detector has been demonstrated to be effective for ISI mitigation and noise suppression.

An LMS adaptive filter may be implemented in a digital signal processing (DSP) unit of a coherent receiver. The LMS adaptive filter may be operated to adaptively converge to a state of balancing ISI mitigation and noise suppression. For narrow filtered input signal with severe ISI, the adaptive filter tends to enhance high frequency components of the signal and thus mitigate the ISI effect, which in the meantime weakens its capability of suppressing high frequency noises. Hence, a subsequent filter with sharp cutoff can be used to further suppress high frequency noises. A partial response filter fits well for the task due to its characteristics of sharp cutoff, simple structure, and controlled ISI that can be completely compensated with a consequent MLSE detector.

The complexity of a MLSE detector, however, is a challenge for practical implementation of the ISI mitigating scheme. For signal formats such as QPSK and 16-QAM that can have independent modulation on In-phase (I) and quadrature (Q) components, the MLSE implementation complexity can be significantly reduced by having separate MLSE detector on the I and Q components. For the 8-QAM signal targeted in the invention, however, the in-phase and quadrature components are not independent and cannot be detected with independent MLSE detectors. Hence, for practical implementation a scheme that partitions the 8 QAM signal after the adaptive filtering into two sets of QPSK signals and each being detected with a MLSE detector similar to one designed for QPSK signal can be used. Thus, for narrowed filtered 8 QAM signals, in some embodiments, an effective ISI mitigation scheme with strong high frequency noise suppression capability and practical implementation complexity can be implemented.

In some embodiments, a QAM signal, e.g., an 8-QAM signal, is partitioned into corresponding subsets of QPSK signals each of which can be filtered with a 1-dimension (i.e., real valued) partial response filter and then detected with 2-state MLSE algorithm separately on its I/Q components. As described in the present document an 8-QAM signal can be partitioned or separated into two 4-QPSK signals, a 16-QAM signal can be separated into 3 QPSK signals, and so on. The partition of the 8-QAM signal can be achieved with a pre-decision on each received 8 QAM symbol to decide which QPSK subset it belongs to. Since the I/Q components of each subset QPSK signal is processed separately, an embodiment can also be described equivalently as partitioning an 8-QAM signal into 4 subsets of BPSK signals that can be processed separately. For simplicity of description and clarity, the disclosed embodiments use QPSK subsets and its corresponding I/Q components for partitioning 8-QAM signals.

After the partitioning, a continuous 8 QAM symbol stream is divided into two discontinuous QPSK symbol streams. A punctuation process can be employed to insert a punctuation mark in one of the two QPSK symbol stream when a current 8-QAM symbol is determined belong to the other QPSK symbol stream. Thus, the filtering and detection processes are applied to punctuated QPSK symbol streams, differentiating the invention from the schemes applied to continuous symbol streams.

In filtering the punctured QPSK symbol stream, the punctuation marks can be replaced by symbols with a predetermined constant value (e.g., +1, 0, or −1) and then a regular filtering process can be applied. Correspondingly, in a subsequent MLSE detection, the punctuation marks can be used to force the signal paths converge to a predetermined constant valued (e.g., +1, 0, or −1) state instead of a regular 2-state (e.g., +1 and −1 valued states) trellis process. In the following descriptions, we use 0 as an example of the constant value of the predetermined state corresponding to a punctuation mark. Although in addition to the two regular states the 0 state is added in the MLSE process, the MLSE complexity is not increased since the 0 states are pre-known with the predetermined punctuation marks in the input symbol stream. After the MLSE detection, the two output punctuated QPSK symbol streams can be combined back into a continuous 8-QAM symbol stream for subsequent processes. With help of the partitioning and punctuation process, and corresponding modifications in the filtering and MLSE process, effective ISI mitigation and high frequency noise suppression can be achieved for narrowed filtered 8 QAM signals without a significant increase in implementation complexity.

Several embodiments now will be described more fully hereinafter with reference to the accompanying drawings. Indeed, the subject technology may be embodied in many different forms and should not be construed as limited to the embodiments set forth herein. Like numbers refer to like elements throughout.

The basic prefiltering or Nyquist WDM transmission system with coherent detection is shown in FIG. 1 as an example embodiment. The lightwave generated laser (101) is split by a polarization beam splitter (PBS) and individually modulated by I/Q modulators (or other type of modulators generating QAM signal), and then combined with a polarization beam combiner (PBC) to realize polarization multiplexed QAM modulation (102). This NRZ-QAM modulation can be realized by cascaded serial or parallel modulators. To obtain Nyquist (symbol-rate channel bandwidth) or faster-than Nyquist WDM signals (less than symbol-rate channel bandwidth), narrow-band filtering and spectrum shaping can be applied on the modulator driving signals (I/Q) with electrical filters and/or the optical multiplexer (103) output signal with narrow-band optical filters. The transmission link (104) consists of optical amplifiers (OA) and optical fiber spans. After transmission, an optical demultiplexer (105) is used to demultiplex the WDM channels to coherent detectors. At the receiver side, a LO signal after PBS is launched into a 90° optical hybrid (106) for coupling with polarization split received signals. The polarization and phase diversified signals are detected with photodiodes (PD) (107) and then digitally sampled in analog-to-digital converters (ADC) (108). Several front-end DSP modules (109) are employed to compensate the optical front end (106 and 107) distortions. Subsequently, the signal is processed for equalizations of static and dynamic linear impairments with an adaptive digital filter, timing and carrier recovery, high frequency noise suppression, sequence detection, and error correction.

Figure 2:
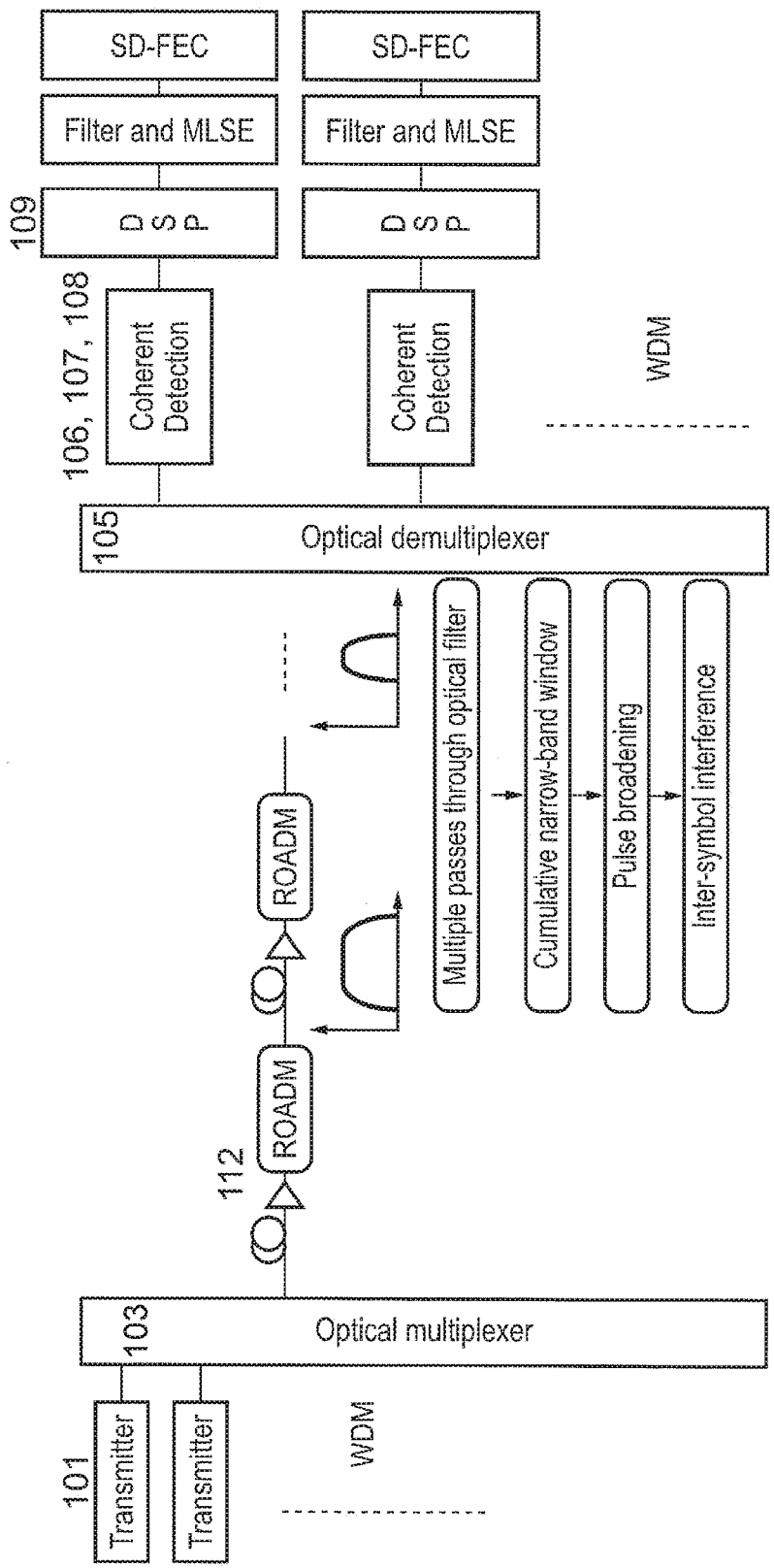
FIG. 2 shows an example of a transmission system that includes cascaded ROADMs.

Meanwhile, to facilitate ease of optical networking, tolerance of spectrum narrowing is critical, as signal channel spacing is degraded after transmission through optical channel, especially when reconfigurable optical add/drop multiplexers (ROADMs) (112) nodes are used in the network as the second exemplary embodiment shown in FIG. 2.

Figure 3:
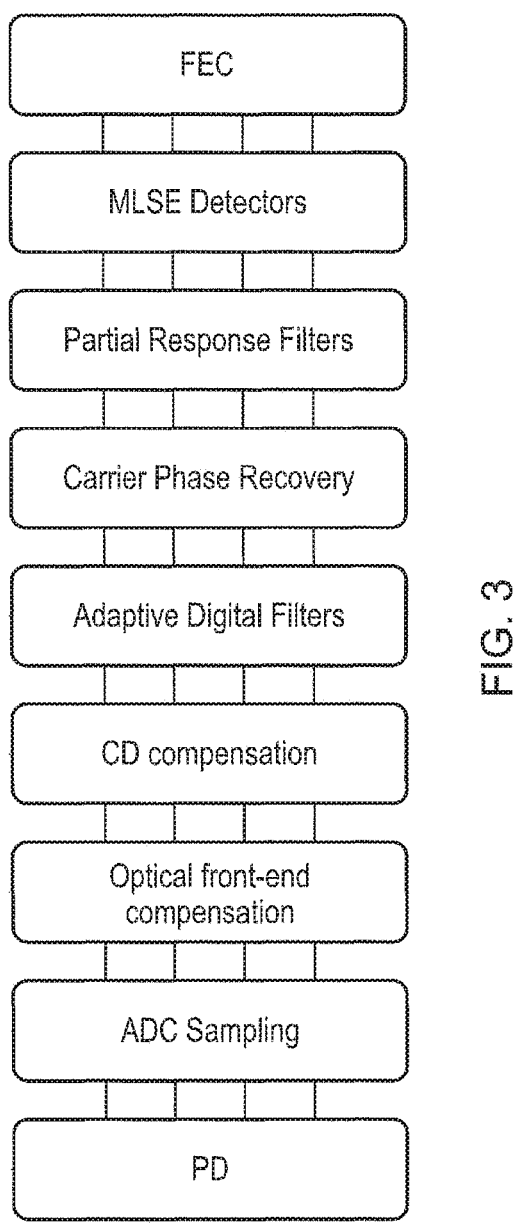
FIG. 3 shows an example embodiment of a process implemented on a Digital Signal Processor (DSP) process.

Both the transmitter-side Nyquist filtering/spectrum shaping and the narrow filtering effects along the transmission line can cause severe ISI in neighboring transmitted symbols. LMS adaptive filters are commonly employed in DSP of coherent receivers, which adaptively converge to a state of balancing ISI mitigation and noise suppression. For narrow filtered input signal with severe ISI, the adaptive filter tends to enhance high frequency components of the signal and thus mitigate the ISI effect, which in the meantime weakens its capability of suppressing high frequency noises. Hence, a subsequent filter with sharp cutoff can be used to further suppress high frequency noises. A partial response filter fits well for the task due to its characteristics of sharp cutoff, simple structure, and controlled ISI that can be completely compensated with a consequent MLSE detector. The DSP scheme using adaptive LMS filters for ISI mitigation, partial response filters together with MLSE detectors for high frequency noise suppression is shown in FIG. 3 as an exemplary embodiment.

Figure 4:
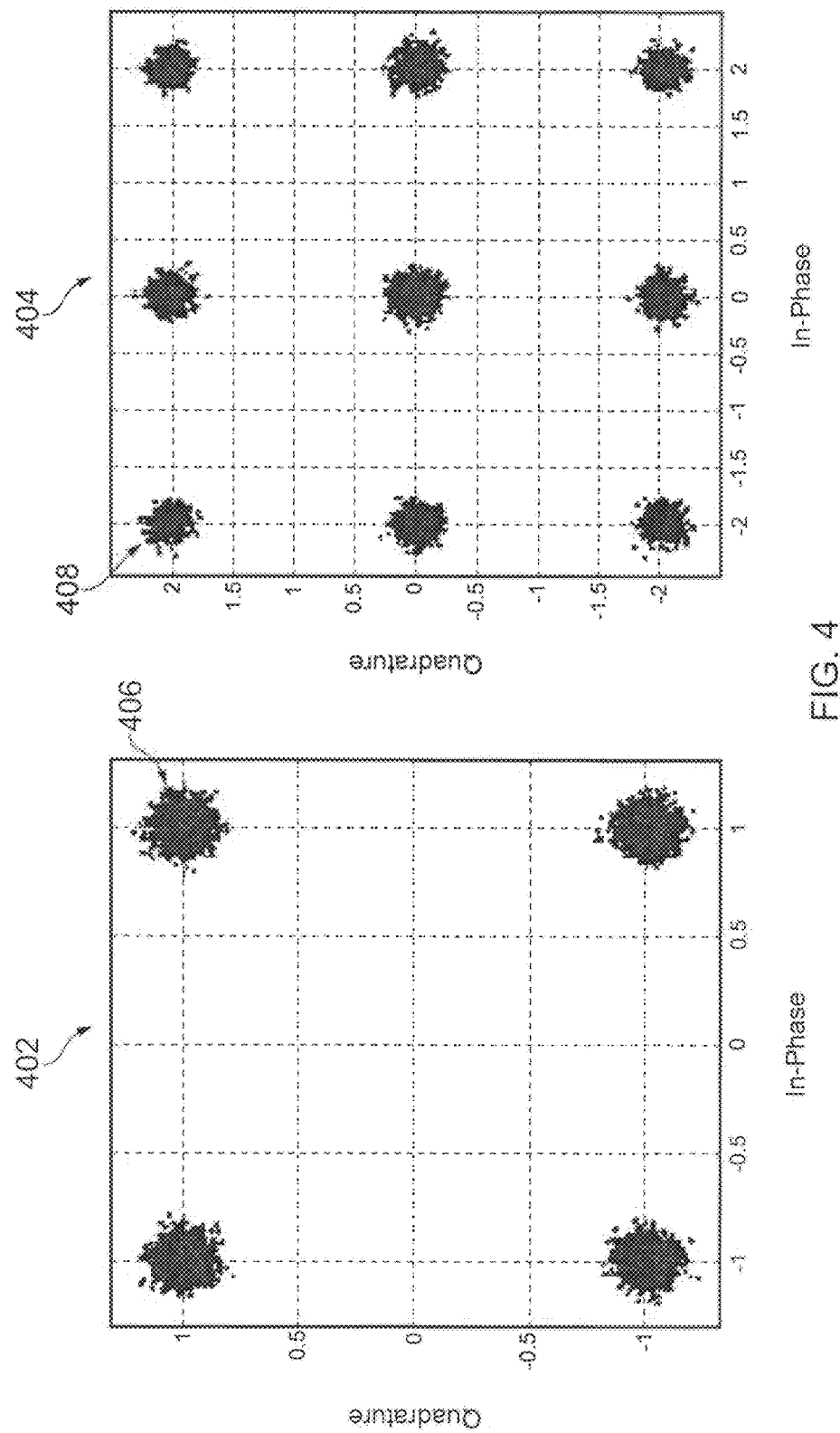
FIG. 4 shows constellations of QPSK signals before and after a partial response filter.
Figure 5:
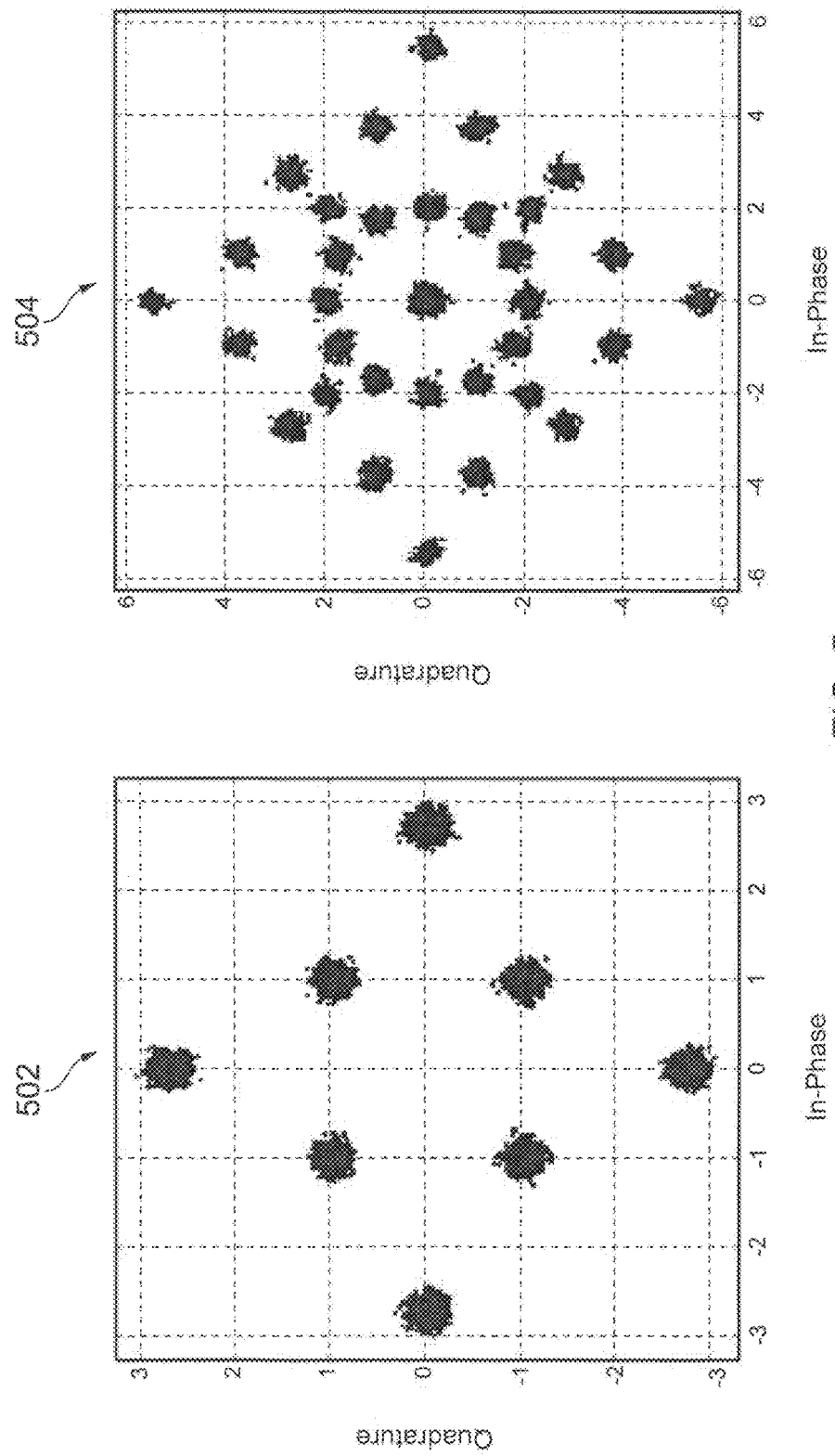
FIG. 5 shows constellations of 8-QAM signals before and after a partial response filter.

The complexity of a MLSE detector, however, is a challenge for practical implementation of the ISI mitigating scheme. FIG. 4 and FIG. 5 show the constellations of QPSK and 8-QAM signals before and after a [1, 1] partial response filter. The [1, 1] filter turns a regular 4-point QPSK constellation 402 into a 9-point constellation 404 and an 8-point 8-QAM constellation 502 into a 33-point constellation 504. Due to the lowpass nature of the filter, the noisy-ness of the constellation points 406 reduced in the corresponding constellation points 408. Although the constellation expansion is induced by the partial response filtering through controlled ISI that can be compensated completely with an MLSE detector, applying MLSE directly on the filtered signals, especially the filtered 8-QAM signal, is not efficient in implementation complexity. From an I/Q component point view, the two components of QPSK can be processed independently with each component having two states before filtering and 3 resulting states after the filtering. Thus, the MLSE complexity can be significantly reduced by having separate MLSE detector on each of the two (I and Q) components. For the 8-QAM signal targeted in the invention, however, I and Q components are not independent and cannot be detected with independent MLSE detectors.

Figure 6:
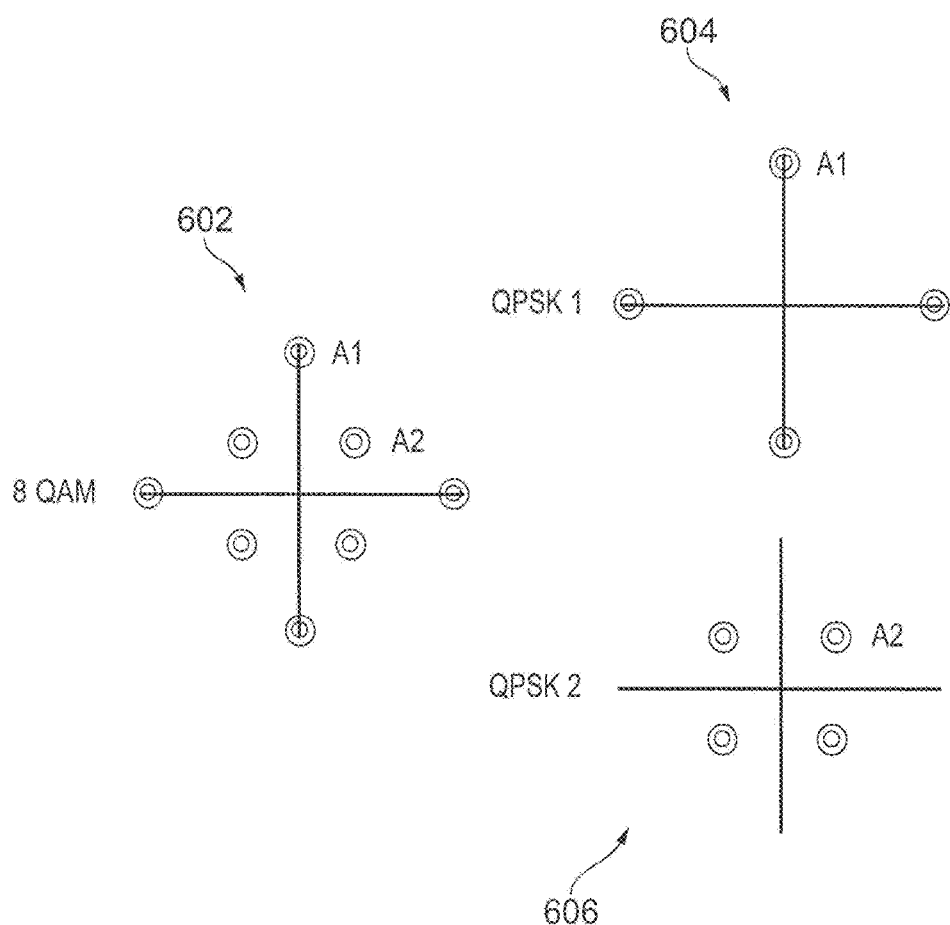
FIG. 6 shows constellations of 8 QAM signal and 2 sets of QPSK signals resulted from partitioning.

Nevertheless, the 8-QAM constellation 602 can be partitioned into two sets of QPSK constellations (604, 606) as depicted in FIG. 6. The participation of the 8-QAM signal is based on the two different signal amplitudes (labeled as A1 and A2 in FIG. 6) observed in its constellation. Although, the two partitioned symbol streams have QPSK-like constellations, they are discontinuous in time domain.

Figure 7:
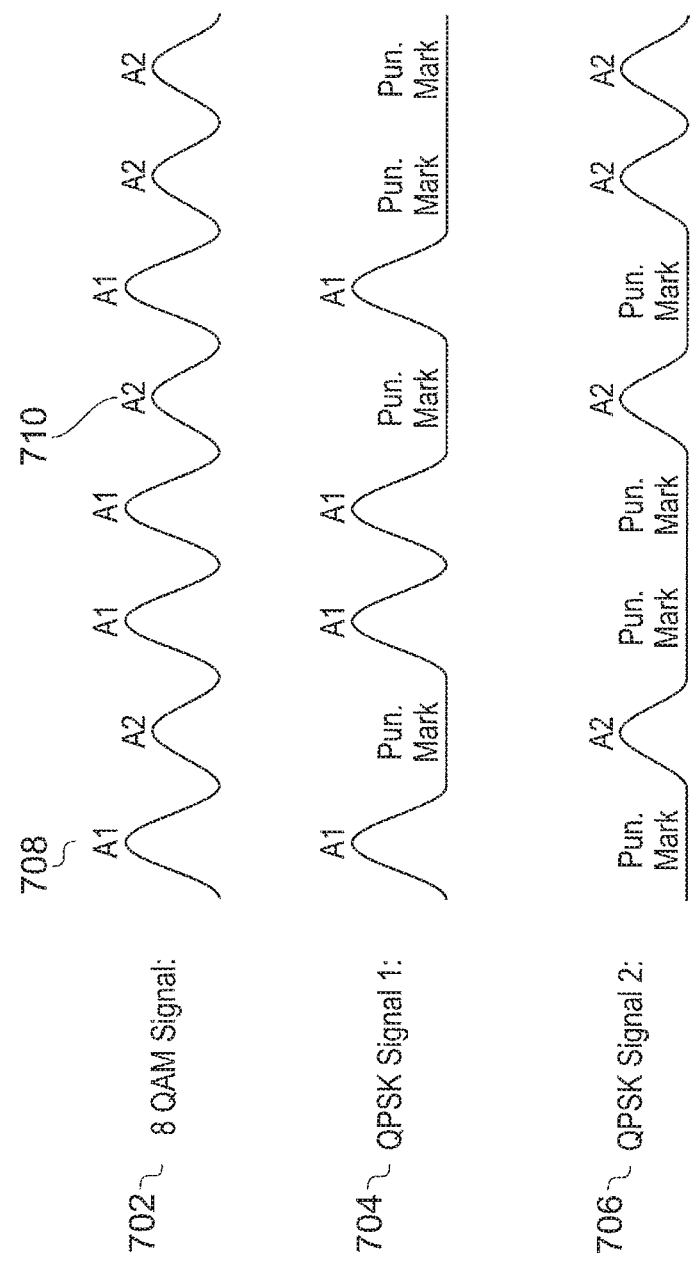
FIG. 7 shows an example process of partitioning and punctuating an 8-QAM signal into two sets of QPSK signals.

FIG. 7 shows an example of separating out an 8QAM signal stream 702 into two 4-QPSK signal streams 704, 706. Because the symbols of an 8 QAM signals can have two different amplitudes, denoted as symbols 708 with amplitudes A1 and symbols 710 with amplitudes A2, the symbol streams can be separated based on amplitudes. Alternatively or additionally, the symbol streams could also be separated out based on phase or the received symbol and which of the two QPSK constellations 604 or 606 it matches better with.

When a current 8-QAM symbol is partitioned to one QPSK stream, the other QPSK stream would have an empty slot at the same time period (e.g., areas denoted "pun. Mark" meaning a punctuation mark). To make the two QPSK symbol streams continuous, a punctuation process can be employed to insert punctuation marks at the empty time slots as depicted in FIG. 7.

Figure 8:
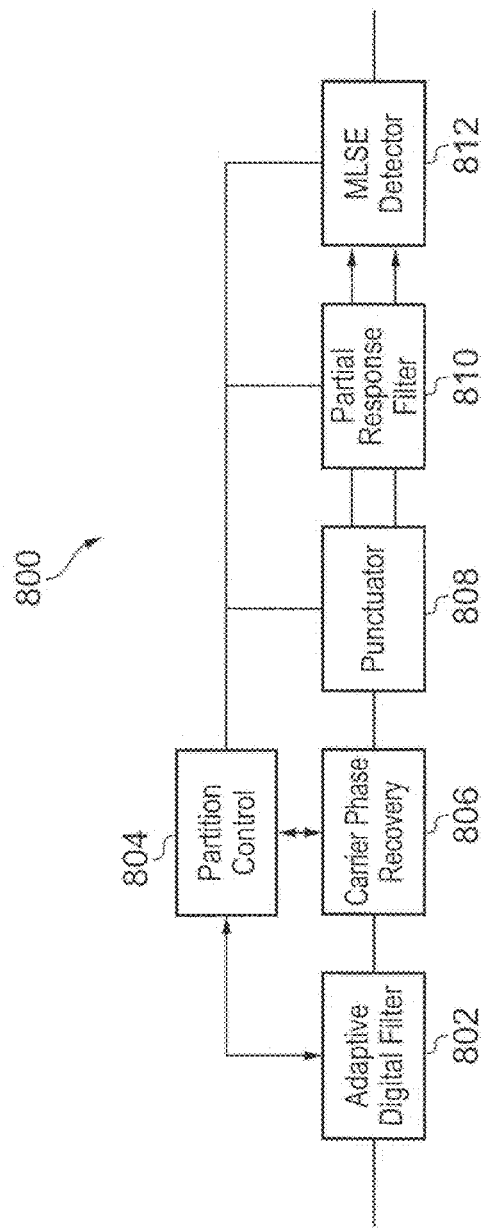
FIG. 8 shows an example structure of an ISI compensation and high-frequency noise suppression subsystem with partition and punctuation processes.

FIG. 8 shows an example structure 800 of an ISI compensation and high-frequency noise suppression subsystem with partition and punctuation processes described above. A partition control unit 804 is used to synchronize all the partition related processed in different DSP modules including adaptive filter 802, carrier phase recovery 806, punctuator 808, partial response filter 810, and MLSE detector 812. Each functional block depicted in the structure 800 may be implemented with hardware-assisted DSP software implementation. For example, software may be used to set up filter coefficients of the adaptive filter 802, while the actual filter multiplications and additions may be performed by hardware multipliers and adders.

The incoming 8-QAM symbol stream is partitioned into two QPSK symbol streams with the participation controller communicating with the adaptive filter and/or the carrier phase recovery module and making pre-decisions on the symbol amplitude. After the participation, punctuation marks are added to the two QPSK symbol streams wherever needed by the punctuator. Depending on the implementation need, the participation can be done in any of the 3 DSP modules, i.e., the adaptive filter, the carrier phase recovery module, or the punctuator. The subsequent filtering and MLSE detection processes are applied to the punctuated QPSK symbol streams.

Figure 9:
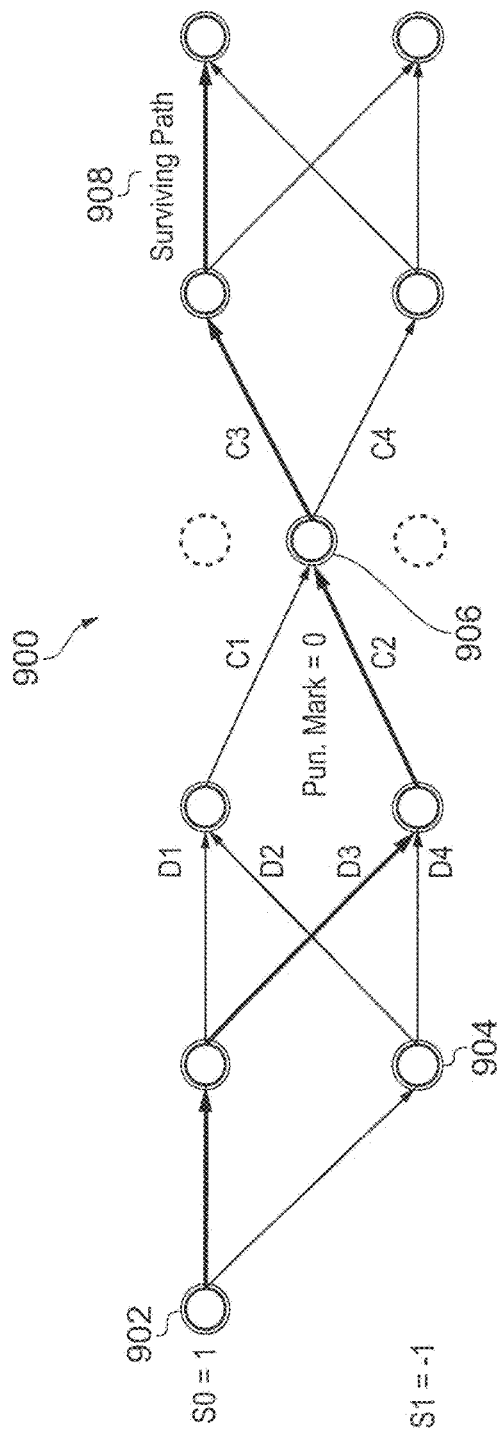
FIG. 9 shows an example of a modified MLSE trellis for punctuated signal samples with two regular symbol states (1 and −1) and a pre-determined punctuation state (0).

FIG. 9 depicts an example of a modified MLSE trellis 900 that can be used in the MLSE detector for punctuated signal samples with two regular symbol states 902 and 904, corresponding to 1 and −1 respectively, and a pre-determined punctuation state 0 (906). The modified trellis 900 and surviving path 908 process is similar to that designed for the I/Q component of a regular QPSK signal, except that the two regular states are replaced by a "0" state at the locations where punctuation mark appears. In other word, a punctuation mark forces the trellis paths converge to a "0" state that is predetermined and only two input path metrics (denoted as C1, C2 in FIG. 9) and two output path metrics (denoted as C3, C4 in FIG. 9) need to be calculated. On the other hand, for the paths connecting two regular states (1, −1), path metrics (denoted as D1, D2, D3, D4 in FIG. 9) are calculated as that in a regular MLSE process. After the MLSE detection, the two output punctuated QPSK symbol streams can be combined with the knowledge of punctuation mark locations back into a continuous 8-QAM symbol stream for subsequent processes. Thus, with help of the partitioning and punctuation process, and corresponding modifications in the filtering and MLSE process, effective ISI mitigation and high frequency noise suppression can be achieved for narrowed filtered 8 QAM signals without a significant increase in implementation complexity.

Figure 10:
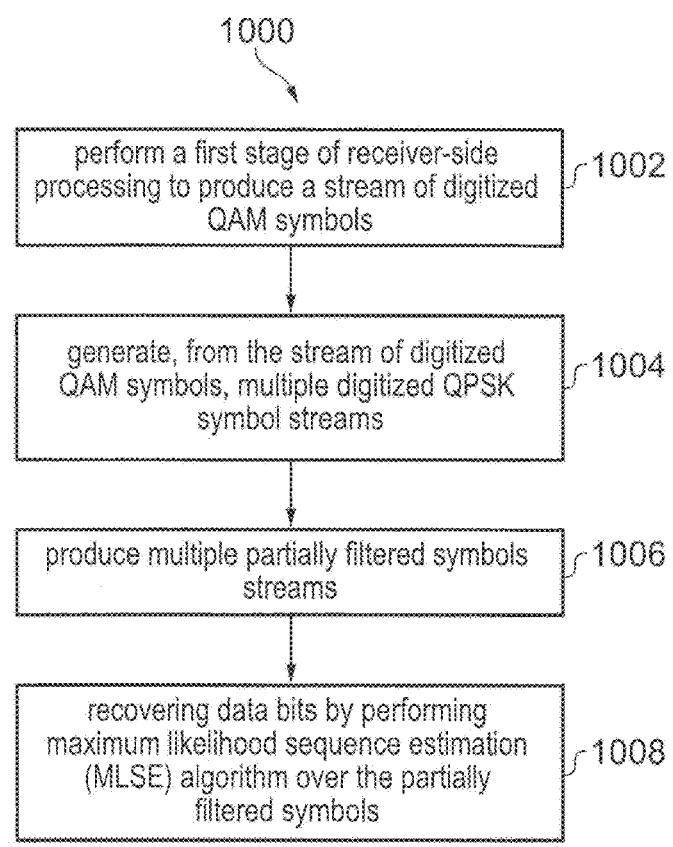
FIG. 10 shows an example flowchart representation of a process of receiving and decoding digital signals.

FIG. 10 shows an example flowchart of a method 1000 for recovering data from a received Quadrature Amplitude Modulation (QAM) signal. The method 1000 may be implemented at a receiver in an optical communication network.

The method 1000 includes performing (1002) a first stage of receiver-side processing to produce a stream of digitized QAM symbols from the received QAM signal. In some embodiments, the first stage receiver-side processing may include receiving an optical signal, recovering at least two polarized components of the optical signal, performing analog to digital conversion of at least one of the at least two polarized components, compensating the analog to digital converted signal for optical front end characteristics, and performing chromatic dispersion correction of the compensated optical signal to generate the stream of digitized QAM signal.

The method 1000 includes generating (1004), from the stream of digitized QAM symbols, multiple digitized Quadrature Phase Shift Keying (QPSK) symbol streams. In some embodiments, generating the multiple digitized QPSK symbol streams may include grouping digitized QAM symbols into the digitized QPSK symbols based on a received signal phase for each digitized QAM symbol.

The method 1000 includes processing (1006) each of the multiple digitized QPSK symbol streams through a partial response filter, thereby resulting in multiple partially filtered symbols streams. In some embodiments described previously, the partial response filter includes a high frequency noise suppression filter having a transition band at a frequency higher than one-half of a symbol frequency of the digitized QAM symbols.

The method 1000 includes recovering (1008) data bits by performing maximum likelihood sequence estimation (MLSE) algorithm over the partially filtered symbols streams. As described in this document, e.g., in FIG. 9, an MLSE embodiment may include computing a surviving path of a trellis in which nodes of the trellis represent states corresponding to QPSK symbols and edges of the trellis represent a transition path having a metric, and determining data bits from the surviving path. Other implementations of an MLSE algorithm may also be possible. In some embodiments, a node of the trellis represents a punctured state when a punctured non-symbol is received for computing the surviving path.

In some embodiments, an optical signal receiver apparatus is disclosed. The apparatus includes a memory for storing data and instructions. The apparatus includes electronic circuitry that performs a first stage of processing to recover a stream of digitized QAM symbols from the received QAM signal, a digital signal processor that generates, from the stream of digitized QAM symbols, multiple digitized Quadrature Phase Shift Keying (QPSK) symbol streams, electronic circuitry that processes each of the multiple digitized QPSK symbol streams through a partial response filter, thereby resulting in multiple partially filtered symbols streams, and electronic circuitry that recovers data bits by performing maximum likelihood sequence estimation (MLSE) algorithm over the partially filtered symbols streams.

Figure 11:
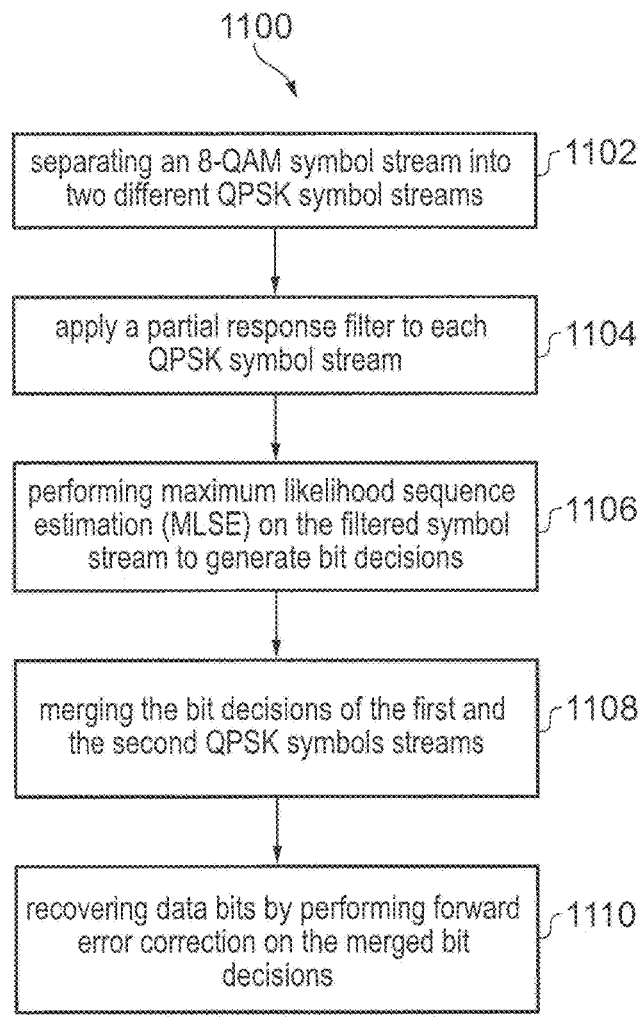
FIG. 11 shows an example block diagram representation of a digital receiver.

FIG. 11 shows an example flowchart of a method 1100 for recovering data encoded in an 8-QAM modulated signal.

The method 1100 includes separating (1102) a stream of 8-Quadrature Amplitude Modulation (8-QAM) symbols into a first stream of Quadrature Phase Shift Keying (QPSK) symbols and a second stream of QPSK symbols.

For each QPSK symbol stream, the method 1100 includes applying (1104) a partial response filter to generate a filtered symbol stream, and performing (1106) maximum likelihood sequence estimation (MLSE) on the filtered symbol stream to generate bit decisions. In some embodiments, performing MLSE algorithm includes computing a surviving path of a trellis in which nodes of the trellis represent states corresponding to QPSK symbols and edges of the trellis represent a transition path having a metric and determining bit decisions from the surviving path.

The method 1100 also includes merging (1108) the bit decisions of the first and the second QPSK symbols streams. The decision merging may be used to form a pre-error correction estimate of received data bits.

The method 1100 also includes recovering (1110) data bits by performing forward error correction on the merged bit decisions.

Many modifications and other embodiments of the techniques disclosed herein will come to mind to one skilled in the art, having the benefit of the teachings presented in the foregoing descriptions and the associated drawings. Therefore, it is to be understood that the scope is not to be limited to the specific examples of the embodiments disclosed and that modifications and other embodiments are intended to be included within the scope of the appended claims. Although specific terms are employed herein, they are used in a generic and descriptive sense only and not for purposes of limitation.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of recovering data from a received Quadrature Amplitude Modulation (QAM) signal, comprising:
    performing a first stage of receiver-side processing to produce a stream of digitized QAM symbols from the received QAM signal, wherein in-phase component and quadrature component of the received QAM signal are dependent on each other;
    generating, from the stream of digitized QAM symbols, multiple digitized Quadrature Phase Shift Keying (QPSK) symbol streams;
    generating, by inserting multiple punctuation marks among the multiple digitized QPSK symbol streams, multiple punctured QPSK symbol streams;
    processing each of the multiple punctured QPSK symbol streams through a partial response filter, thereby resulting in multiple partially filtered symbols streams; and
    recovering data bits by performing maximum likelihood sequence estimation (MLSE) algorithm over the partially filtered symbols streams.

2. The method of claim 1, wherein the performing MLSE algorithm includes:
    computing a surviving path of a trellis in which nodes of the trellis represent states corresponding to the punctured QPSK symbol streams and edges of the trellis represent a transition path having a metric; and
    determining data bits from the surviving path.

3. The method of claim 1 wherein the first stage of receiver-side processing includes:

receiving an optical signal;
recovering at least two polarized components of the optical signal;
performing analog to digital conversion of at least one of the at least two polarized components;
compensating the analog to digital converted signal for optical front end characteristics; and
performing chromatic dispersion correction of the compensated optical signal to generate the stream of digitized QAM signal.

4. The method of claim 1, wherein the generating the multiple digitized QPSK symbol streams includes:
grouping digitized QAM symbols into the digitized QPSK symbols based on a received signal amplitude for each digitized QAM symbol.

5. The method of claim 1, wherein the generating the multiple digitized QPSK symbol streams includes:
grouping digitized QAM symbols into the digitized QPSK symbols based on a received signal phase for each digitized QAM symbol.

6. The method of claim 1, wherein the partial response filter includes a high frequency noise suppression filter having a transition band at a frequency higher than one-half of a symbol frequency of the digitized QAM symbols.

7. The method of claim 2, wherein a node of the trellis represents a punctured state when a punctuation mark of the multiple punctuation marks is received for computing the surviving path.

8. An optical signal receiver apparatus, comprising:
a memory;
electronic circuitry that performs a first stage of processing to recover a stream of digitized QAM symbols from the received QAM signal, wherein in-phase component and quadrature component of the received QAM signal are dependent on each other;
a digital signal processor that generates, from the stream of digitized QAM symbols, multiple digitized Quadrature Phase Shift Keying (QPSK) symbol streams;
a punctuation processor that generates, by inserting multiple punctuation marks among the multiple digitized QPSK symbol streams, multiple punctured QPSK symbol streams;
electronic circuitry that processes each of the multiple punctured QPSK symbol streams through a partial response filter, thereby resulting in multiple partially filtered symbols streams; and
electronic circuitry that recovers data bits by performing maximum likelihood sequence estimation (MLSE) algorithm over the partially filtered symbols streams.

9. The apparatus of claim 8, wherein the performing MLSE algorithm includes:
computing a surviving path of a trellis in which nodes of the trellis represent states corresponding to the punctured QPSK symbol streams and edges of the trellis represent a transition path having a metric; and
determining data bits from the surviving path.

10. The apparatus of claim 8, wherein the first stage of processing includes:
receiving an optical signal;
recovering at least two polarized components of the optical signal;
performing analog to digital conversion of at least one of the at least two polarized components;
compensating the analog to digital converted signal for optical front end characteristics; and
performing chromatic dispersion correction of the compensated optical signal to generate the stream of digitized QAM signal.

11. The apparatus of claim 8, wherein the generating the multiple digitized QPSK symbol streams includes:
grouping digitized QAM symbols into the digitized QPSK symbols based on a received signal amplitude for each digitized QAM symbol.

12. The apparatus of claim 8, wherein the generating the multiple digitized QPSK symbol streams includes:
grouping digitized QAM symbols into the digitized QPSK symbols based on a received signal phase for each digitized QAM symbol.

13. The apparatus of claim 8, wherein the partial response filter includes a high frequency noise suppression filter having a transition band at a frequency higher than one-half of a symbol frequency of the digitized QAM symbols.

14. The apparatus of claim 9, wherein a node of the trellis represents a punctured state when a punctuation mark of the multiple punctuation marks is received for computing the surviving path.

15. A program product comprising a non-transitory processor-readable storage medium holding processor-readable instructions, the instructions, when executed by a processor, causing the processor to implement a data reception method, comprising:
separating a stream of 8-Quadrature Amplitude Modulation (8-QAM) symbols into a first stream of Quadrature Phase Shift Keying (QPSK) symbols and a second stream of QPSK symbols, wherein in-phase component and quadrature component of the 8-QAM symbols are dependent on each other;
generating, by inserting a punctuation mark between the first stream of QPSK symbols and the second stream of QPSK symbols, two punctured QPSK symbol streams;
for each of the punctured stream of QPSK symbols:
applying a partial response filter to generate a filtered symbol stream; and
performing maximum likelihood sequence estimation (MLSE) on the filtered symbol stream to generate bit decisions;
merging the bit decisions of the first and the second QPSK symbols streams; and
recovering data bits by performing forward error correction on the merged bit decisions.

16. The computer program product of claim 15, wherein the performing MLSE algorithm includes:
computing a surviving path of a trellis in which nodes of the trellis represent states corresponding to the punctured QPSK symbol streams and edges of the trellis represent a transition path having a metric; and
determining bit decisions from the surviving path.

17. The computer program product of claim 15, wherein the generating the first and the second QPSK symbol streams includes:
grouping digitized QAM symbols into the digitized QPSK symbols based on a received signal amplitude for each digitized QAM symbol.

18. The computer program product of claim 15, wherein the generating the first and the second QPSK symbol streams includes:
grouping digitized QAM symbols into the digitized QPSK symbols based on a received signal phase for each digitized QAM symbol.

19. The computer program product of claim 15, wherein the partial response filter includes a high frequency noise suppression filter having a transition band at a frequency higher than one-half of a symbol frequency of the digitized QAM symbols.

20. The computer program product of claim 16, wherein a node of the trellis represents a punctured state when a punctuation mark of the multiple punctuation marks is received for computing the surviving path.

* * * * *